(12) United States Patent
Kropp et al.

(10) Patent No.: US 7,135,785 B2
(45) Date of Patent: Nov. 14, 2006

(54) GENERATOR UNIT FOR TRACTORS AND ELECTRICAL DRIVE SYSTEM FOR AGRICULTURAL DEVICES

(75) Inventors: Dieter Kropp, Overath (DE); Andreas Roth, Neunkirchen-Seelscheid (DE); Wolfgang Adamek, Lohmar (DE); Holger Jung, Aldenhoven (DE)

(73) Assignee: GKN Walterscheid GmbH (DE)

( * ) Notice: Subject to any disclaimer, the term of this patent is extended or adjusted under 35 U.S.C. 154(b) by 212 days.

(21) Appl. No.: 10/762,662

(22) Filed: Jan. 22, 2004

(65) Prior Publication Data
US 2004/0150228 A1 Aug. 5, 2004

(30) Foreign Application Priority Data
Jan. 24, 2003 (DE) ................ 103 03 050

(51) Int. Cl.
*F02D 29/06* (2006.01)
(52) U.S. Cl. .............. 290/40 C; 290/45; 290/1 R; 310/75 R; 310/96; 74/11
(58) Field of Classification Search .......... 290/40 C, 290/45, 1 R, 1 A; 310/75 R, 96, 101; 74/11
See application file for complete search history.

(56) References Cited

U.S. PATENT DOCUMENTS

| | | | |
|---|---|---|---|
| 1,726,760 A | | 9/1929 | Otwell |
| 1,772,247 A | * | 8/1930 | Hanks et al. .............. 180/53.1 |
| 2,290,835 A | * | 7/1942 | Lorimor ................... 74/15.84 |
| 2,433,573 A | | 12/1947 | Montgomery |
| 2,472,450 A | | 6/1949 | Van Vleck |
| 2,606,624 A | | 8/1952 | Chiotte |
| 2,618,979 A | * | 11/1952 | Benning ................... 74/15.4 |
| 2,624,416 A | * | 1/1953 | Larsen ................... 180/53.1 |
| 2,752,795 A | | 7/1956 | Tangen |
| 3,001,409 A | * | 9/1961 | Von Fumetti ................ 74/11 |
| 3,042,808 A | | 7/1962 | Jackson |
| 3,088,413 A | * | 5/1963 | Johnson .................. 417/341 |
| 4,171,028 A | * | 10/1979 | van der Lely ............. 180/235 |
| 4,618,016 A | * | 10/1986 | van der Lely ............. 180/53.6 |
| 4,864,878 A | | 9/1989 | Pralle |
| 6,564,891 B1 | * | 5/2003 | Ishii et al. .................. 180/53.1 |
| 6,909,197 B1 | * | 6/2005 | Kaga et al. ............... 290/40 C |

FOREIGN PATENT DOCUMENTS

DE  43 42 006 A1  6/1995

(Continued)

OTHER PUBLICATIONS

Gerhard Prouschen and Garhard Wiechmann, "In Landwirtschafts- und Gartenbaubetrieben: Bei Netzausfall-Zapfwellengenerator", Elektrodionst Jul. 1971, pp. 19-20.
Leroy Somer Gearlec—Tractelec GT/GMD—TM/TF (Inbetriebnahme und Wartung, undated, 15 pages.

*Primary Examiner*—Darren Schuberg
*Assistant Examiner*—Iraj A. Mohandesi
(74) *Attorney, Agent, or Firm*—Harness, Dickey & Pierce, P.L.C.

(57) ABSTRACT

A generator unit for tractors (1) has a housing (4), which can be non-rotationally mounted on a component of the tractor (1). An input shaft is rotationally supported in the housing (4) and connectable to a power take-off shaft (2) of the tractor (1). An electrical generator (6) is coupled with the housing. The electrical generator (6) has a stator and a rotor, which is drive-wise connected to the input shaft and is driven by the same. The electrical generator (6) serves to driver electrical loads of the tractor 1 or of an agricultural device.

4 Claims, 5 Drawing Sheets

| | FOREIGN PATENT DOCUMENTS | | FR | 2 554 064 | 5/1985 |
|---|---|---|---|---|---|
| DE | 199 28 471 A1 | 12/2000 | | | |
| EP | 1 166 611 | 1/2002 | * cited by examiner | | |

GENERATOR UNIT FOR TRACTORS AND ELECTRICAL DRIVE SYSTEM FOR AGRICULTURAL DEVICES

CROSS-REFERENCE TO RELATED APPLICATIONS

This application claims priority to German Patent Application Nos. 10303050.6 filed Jan. 24, 2003, which application is herein expressly incorporated by reference.

FIELD OF THE INVENTION

The invention relates to a generator unit for tractors and an electrical drive system for agricultural devices. The invention drives the electrical loads of agricultural devices such as working units for control devices, mowing devices, field sprayers or spraying devices.

BACKGROUND OF THE INVENTION

Conventionally these types of working units are driven mechanically. If these attachment devices for a tractor or agricultural devices are pulled by a tractor, the working units are connected by a mechanical drive line to a power take-off shaft of the tractor. The power take-off shaft is driven by the main drive, generally the tractor internal combustion engine.

In self-propelled agricultural working devices, the working units are driven directly by the main drive. Hydraulic drive systems are also known, in which the main drive drives a hydraulic pump, which serves as the hydraulic pressure source. Via hydraulic lines, hydraulic motors are driven, which again drive the working units.

These conventional drive systems have a multitude of mechanical drive components, which are dimensioned according to the to be transmitted torque. This leads to large and heavy drive systems. Therefore, the assembly of the drive components is cumbersome.

Small loads electrical motors have been used to drive self-propelled vehicles. The motors are connected to the vehicle electric system. These vehicle electric systems, however, generally only generate a nominal battery voltage of 12 Volts and a generator nominal voltage of 14 Volts. This voltage, however, is insufficient to drive electrical loads of drive units of agricultural devices. The electrical loads of the agricultural devices are too high.

SUMMARY OF THE INVENTION

It is an object of the present invention to provide a generator unit for common tractors or agricultural machines which converts low nominal voltage of the vehicle electric system to higher nominal voltages to be able to drive electrical loads of agricultural devices.

In accordance with the present invention, a generator unit for tractors comprises a housing. The housing can be non-rotationally connected to a component of the tractor. An input shaft is rotationally supported in the housing and connectable to a power take-off shaft of the tractor. An electrical generator is coupled with the housing. The electrical generator has a rotor, which is driving-wise connected to and driven by the input shaft and a stator. The electrical generator drives electrical loads of the tractor or of agricultural devices.

Accordingly, any tractor with a power take-off shaft and a common electrical wiring system can be converted to drive electrical loads driven by a nominal voltage different from the nominal voltage of the electrical wiring system. Common electrical wiring systems are 12 Volts or 24 Volts. In 12 Volts-electrical wiring systems, the battery nominal voltage is 12 Volts and the generator nominal voltage is 14 Volts. In 24 Volts-electrical wiring systems, the battery nominal voltage is 24 Volts and the generator nominal voltage is 28 Volts.

A tractor with the generator unit according to the invention can be adapted to an additional electrical wiring system with higher nominal voltages. As a rule, the nominal voltages are a multiple of a 12-Volt-electrical wiring system. Therefore, for example, a 42 Volt-electrical wiring system can be provided, in which the battery nominal voltage is 36 Volts and the generator nominal voltage is 42 Volts.

An output shaft may be provided, which is driving-wise connected to the input shaft and which may also be connected to the drive shaft of an agricultural device. Therefore, the power take-off shaft can mechanically drive individual drive units since the output shaft can be connected, during driving via the input shaft, to the power take-off shaft. Advantageously, the input shaft and the output shaft are formed as a unified component.

In order to connect standardized drive elements, for example universal shafts, to the output shaft, the output shaft has the same profile as the power take-off shaft of the tractor to be able to connect to the agricultural device. The electrical generator, in order to achieve the required electrical power, has a gear provided between the input shaft and the rotor of the electrical generator.

Further, a generator unit for agricultural devices comprises a housing. The housing is non-rotationally connected to a component of the agricultural device. A hydraulic motor can be connected to a hydraulic pressure source of the agricultural device and driven by the same. An electrical generator has a rotor, which is driving-wise connected to and driven by the hydraulic motor, and a stator. The electrical generator is connected to the housing. The electrical generator drives electrical loads of the agricultural device.

Accordingly, any agricultural machines with a hydraulic supply can be provided at a later date with an electrical wiring system for the electrical supply, which nominal voltage differs from the nominal voltage of the conventional vehicle electric system. Generally, in agricultural machines, the nominal voltage of the electrical wiring system is 12 Volts or 24 Volts. With a generator unit according to the invention, the agricultural machines can be provided with an additional electrical wiring system with 42 Volts.

The object is, further, solved by a drive system for agricultural machines with an above described generator unit. The drive system has electrical motors which are fed by the electrical generator with electrical energy and by which working units of the agricultural machines are driven.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
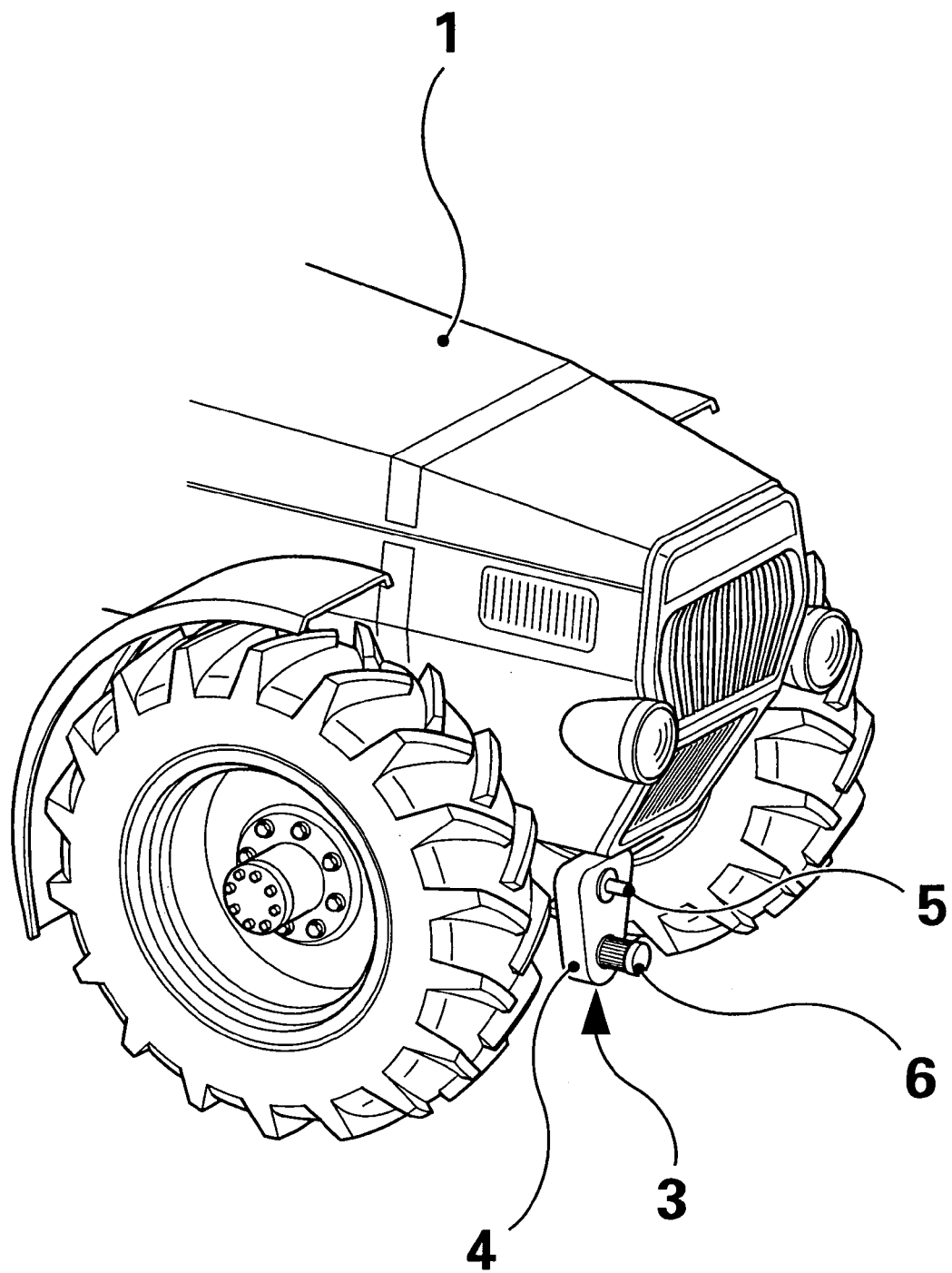
FIG. 1 is a partial perspective partial view of a tractor having a generator unit plugged onto a power take-off shaft.
Figure 2:
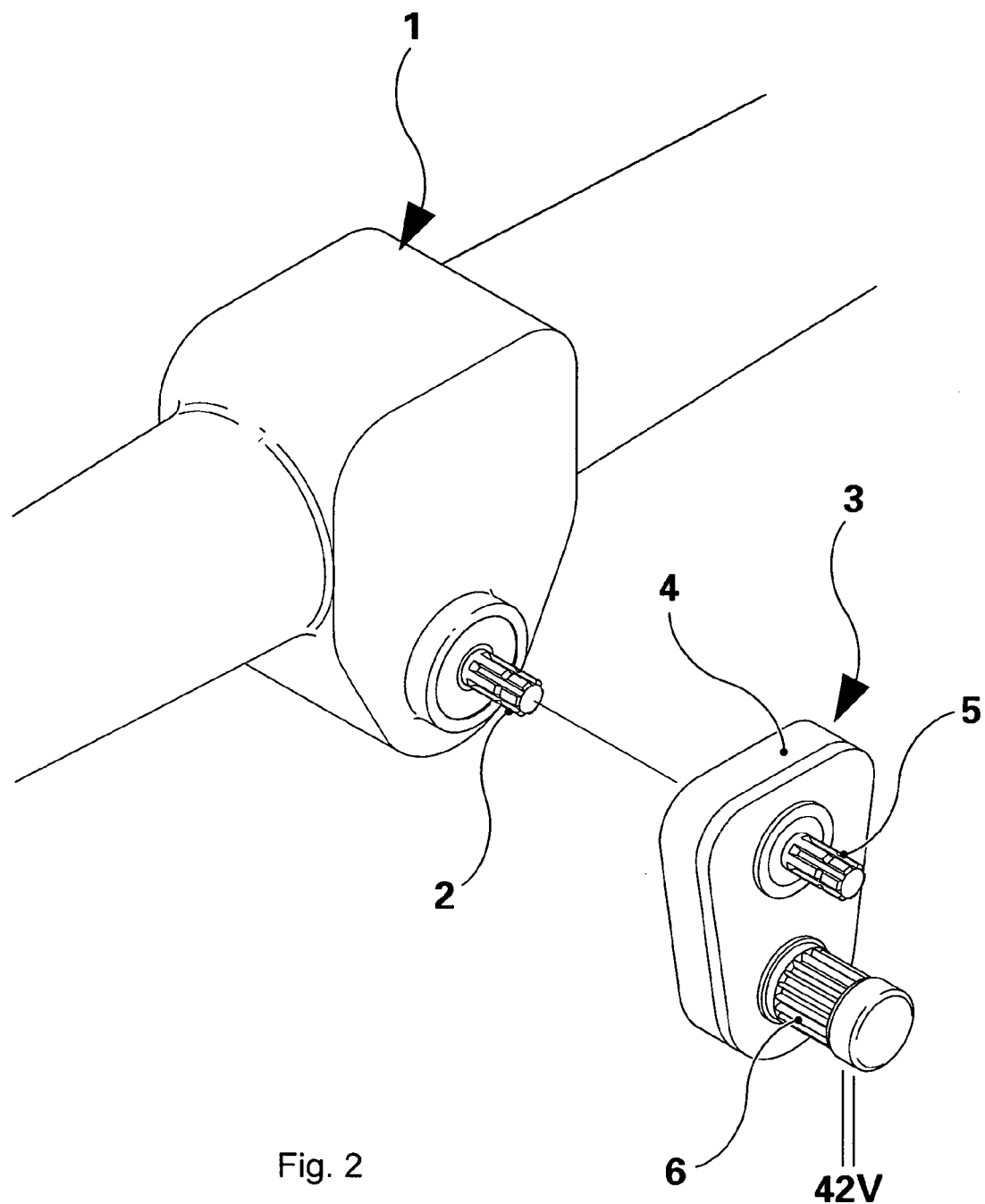
FIG. 2 is an exploded view of the generator unit according to FIG. 1.
Figure 5:
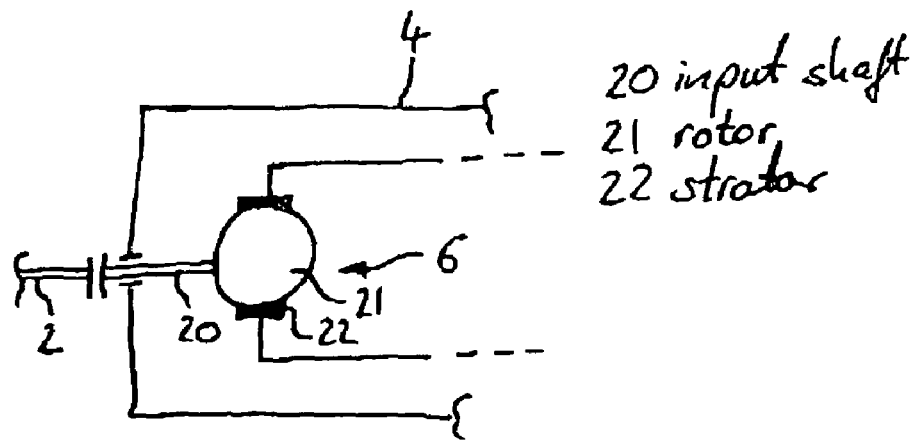
FIG. 5 is a schematic view of the generator in FIG. 1.

FIGS. 1 and 2 show a partial view of a tractor 1. FIG. 5 shows a schematic view of a first embodiment of the generator unit. The tractor 1 has a power take-off shaft 2 to drive agricultural devices. The power take-off shaft 2 is drive-wise connected to the main drive of the tractor 1, generally an internal combustion engine. The power take-off shaft is driven at a constant number of revolutions. Typical numbers of revolutions for a power take-off shaft are 540 rev/min and 1000 rev/min.

A generator unit 3 is plugged onto the power take-off shaft 2. The generator unit 3 has a housing 4. The housing 4 is non-rotationally held relative to the tractor 1. An input shaft 20 is provided in the housing 4. The housing 4 has a bore corresponding to the power take-off shaft 2. Generally the power take-off shaft 2 has longitudinal splines. The input shaft 20 has splines formed in a counter fitting manner to mate with the take-off shaft 2. The input shaft 20 is connected to an output shaft 5 or is formed as a single component with the same. The output shaft 5 extends from the housing 4. The end of the output shaft 5 projects from the housing 4. The output shaft 5 is formed, in profile, identical to the power take-off shaft 2. Thus, standardized drive components, for example a universal shaft, can be connected to the output shaft 5.

An electrical generator 6 is mounted on the housing 4. The generator 6 has a stator 22 non-rotationally connected to the housing 4. The generator 6 has a rotor 21 arranged to rotate around a rotational axis in the housing 4. The rotor 21 is drive-wise connected to the input shaft 20. This can, for example, be achieved by a spur gear. Therefore, the electrical generator 6 is driven with the number of revolutions of the power take-off shaft 2. Alternatively, a gear ratio may be provided between the input shaft 20 and the rotor 21 to increase or reduce the number of revolutions.

Thus, the generator unit 3 can simply be plugged onto the power take-off shaft 2 with an electrical source of, for example 42 Volts. The power take-off shaft 2 is still able to drive, via the output shaft 5, mechanical drive units.

Figure 3:
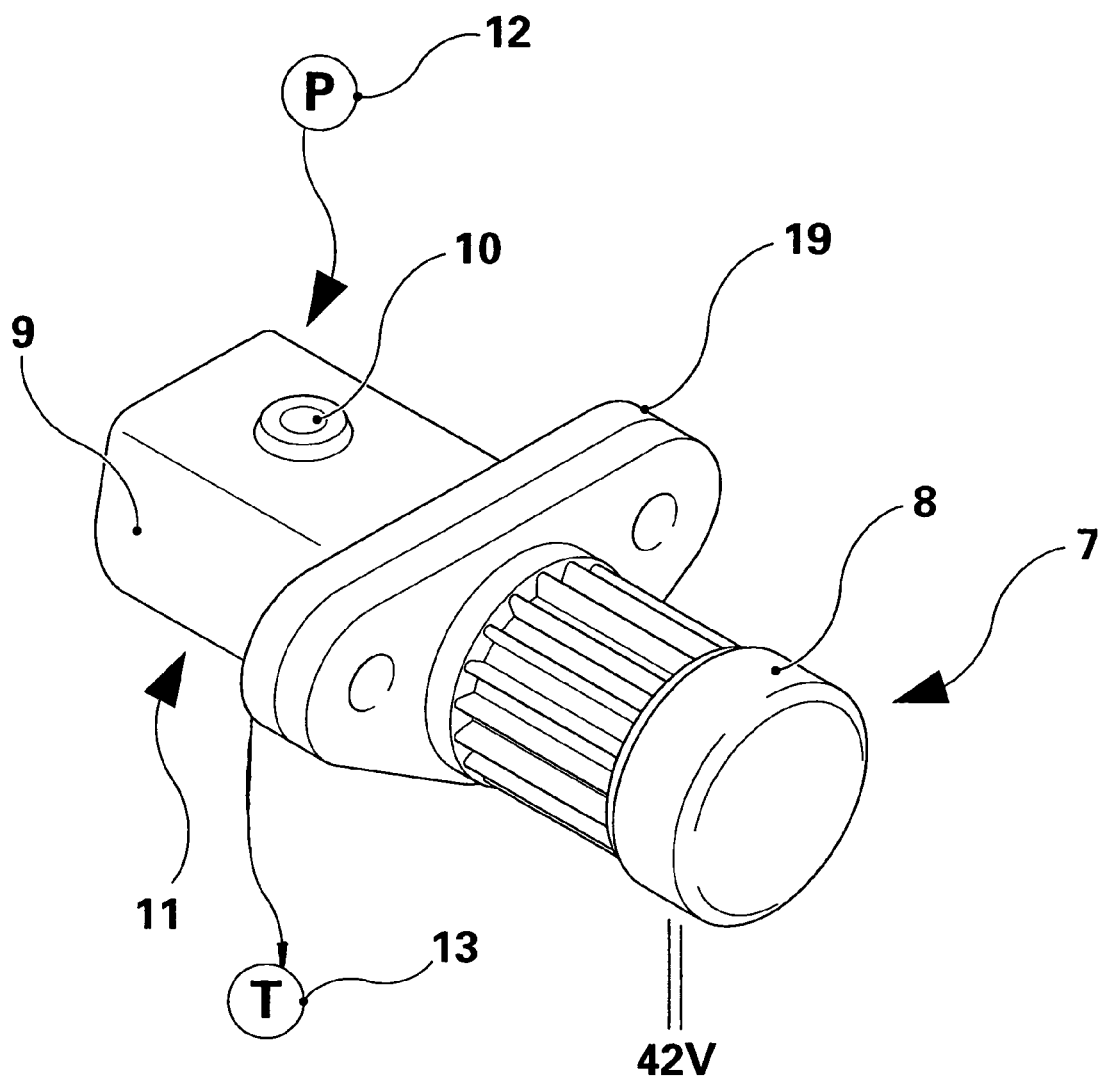
FIG. 3 is a perspective view of a generator unit, driven by a hydraulic motor.
Figure 6:
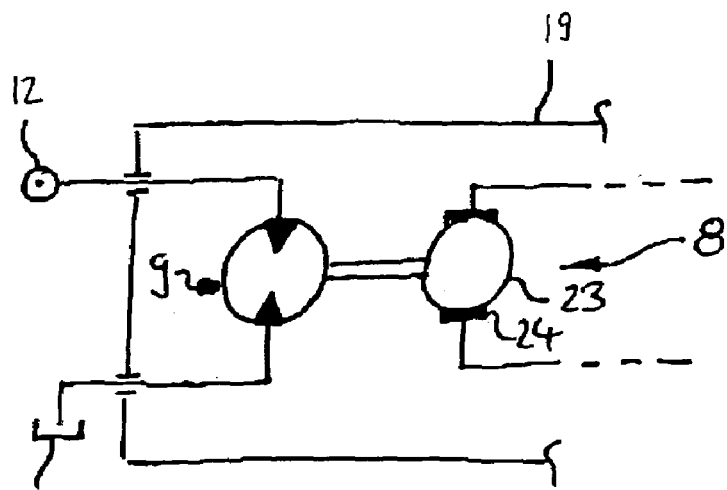
FIG. 6 is a schematic view of the generator in FIG. 3.

FIGS. 3 and 6 show another embodiment of a generator unit 7. The unit 7 has an electrical generator 8 with a stator 24 non-rotationally held in a housing 19 of the generator unit 7. A rotor 23 rotates relative to the stator 24. The rotor 23 is connected to a hydraulic motor 9 and is driven by the same. The hydraulic motor 9 has a first hydraulic connection port 10 and a second hydraulic connection port 11. The first hydraulic connection port 10 is connected to a hydraulic pump 12. The second hydraulic connection port 11 is connected to a hydraulic tank 13. The hydraulic pump 12 can be driven by the main drive of an agricultural implement. Therefore, an agricultural implement can be adapted in this simple way by integration of the generator unit 7 into the hydraulic system of the agricultural implement.

Figure 4:
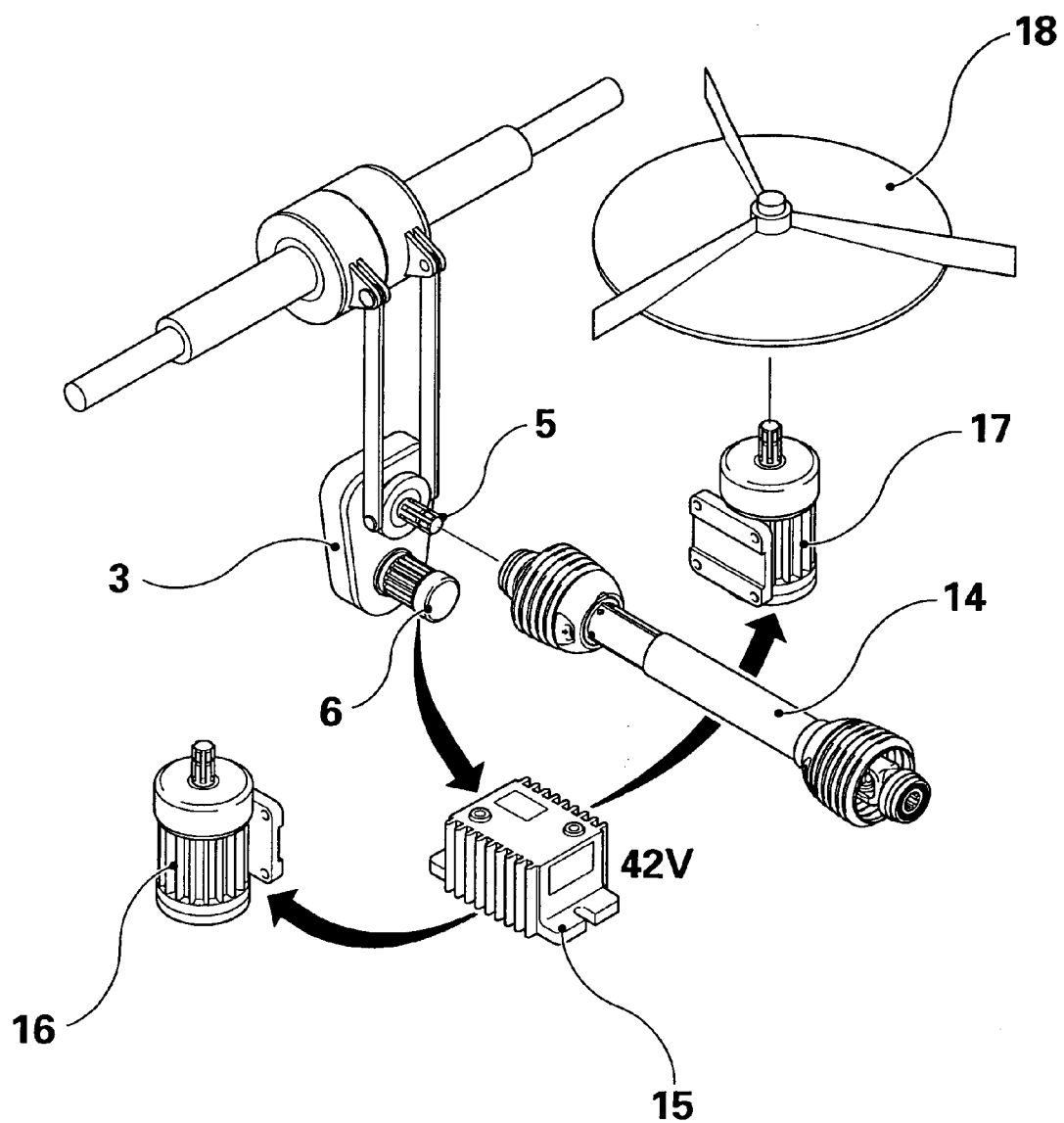
FIG. 4 is a perspective view of a drive system for electrical motors.

FIG. 4 shows a drive system. The generator unit 3, according to FIGS. 1 and 2, can be plugged onto a power take-off shaft of a tractor. For clarity, the tractor is not represented in this view. The generator unit 3 comprises an electrical generator 6 electrically connected to a control device 15. The control device 15 is again electrically connected to electromotors 16, 17. For example, the electromotors 16, 17 may drive a rotary mowing disc 18 or other agricultural working devices. The control device 15 operates the electromotors 16, 17 through an additional vehicle electrical wiring system. The output shaft 5 of the generator unit 3 is connected to a universal shaft 14. Thus, further mechanically driven working units may be driven by the universal shaft.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A generator unit for tractors comprising:
    a housing non-rotationally being connectable to a component of a tractor;
    an input shaft being rotationally supported in the housing, said input shaft connectable to a power take-off shaft of the tractor;
    an electrical generator including a stator and a rotor, said rotor is drive-wise connected to and driven by the input shaft, said electrical generator coupled with the housing; and
    the electrical generator driving electrical loads of the tractor or of an agricultural device; an output shaft being drive-wise connected to the input shaft and connectable to the drive shaft of an agricultural device.

2. The generator according to claim 1, wherein the input shaft and the output shaft are formed as a unified component.

3. The generator according to claim 1, wherein the output shaft has an end which can be connected to an agricultural device, which has a profile same as the power take-off shaft of the tractor.

4. The generator unit according to claim 1, wherein a gear is provided between the input shaft and the rotor of the electrical generator.

* * * * *